Patented Feb. 8, 1927.

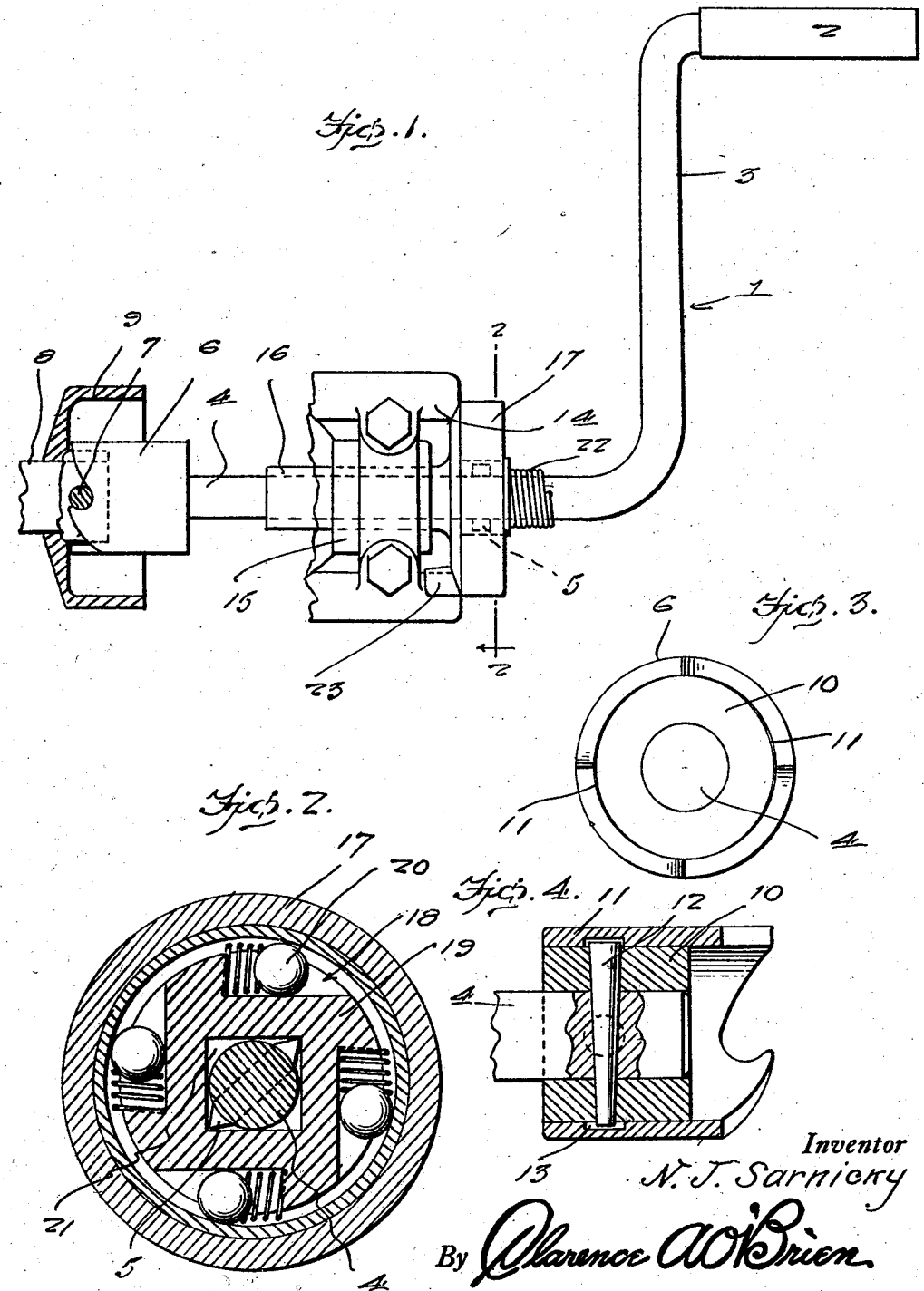

1,616,872

UNITED STATES PATENT OFFICE.

NICKOLAS J. SARNICKY, OF GAS CITY, INDIANA.

SAFETY CRANK FOR AUTOMOBILES.

Application filed May 22, 1926. Serial No. 111,063.

This invention relates to an improved automotive safety appliance, and it has more particular reference to an improved safety hand crank for automobiles.

More specifically, it has reference to an improved clutch element for engaging the pin on the engine shaft, an improved bearing in which the hand crank is mounted for rotation, and an improved locking clutch cooperable with the bearing to prevent accidental retrograde movement of the hand crank, thus relieving the operator of serious injury and preventing distortion of the hand crank and complemental parts in case the engine accidentally back-fires.

My principal object is to generally improve upon devices of this class by providing one which includes novel details arranged in a new combination of elements, producing an improved product of manufacture capable of accomplishing the desired result in a highly practical manner.

In the accompanying drawings forming a part of this application and in which like numerals are employed to designate like parts throughout the same:—

Figure 1 is an elevational view of parts of a conventional automobile showing the improved device associated therewith.

Fig. 2 is an enlarged detail section taken approximately upon the plane of the line 2—2 of Fig. 1.

Fig. 3 is a view on an enlarged scale of the clutch elements.

Fig. 4 is likewise a view of said elements, showing the manner in which it is connected with the hand crank.

Referring to the drawings in detail, the reference character 1 designates generally the hand crank which includes the usual hand grip 2 and right angularly disposed portions 3 and 4 respectively. Adjacent the juncture of the portions 3 and 4, the last named portion 4 is provided with diametrically opposite keys 5 which serve a purpose to be hereinafter described. On the free end of this portion 4 is the usual clutch element 6 having ratchet teeth adapted to engage a cross-pin 7 on the engine shaft 8. I have also shown the belt pulley 9 in the drawing.

At this time, I would direct attention to the Figs. 3 and 4, wherein it will be seen that the portion 4 is provided with a surrounding collar 10, this collar having portions of the metal removed from diametrically opposite sides as indicated at 11. This makes the collars somewhat ovate in configuration and since the tooth carrying clutch sleeve 6 is of true circular design, clearance spaces are provided on opposite sides as shown.

It will be noticed in this connection that the sleeve 6 is fitted onto this collar by friction, and the friction is depended upon to effect the connection. The connection is so tight that under ordinary conditions when the hand crank is turned over, it will always impart rotation to the engine shaft. In event of engine back-fire, however, the sleeve 6 will be permitted to rotate around the collar 10 to prevent breakage. The collar is connected to the crank shaft by a connecting pin 12 and it will be noticed that the ends of this pin extend beyond the periphery of the collar and into an annular groove 13 formed in the sleeve. This prevents endwise displacement of the sleeve.

An appropriate stationary bearing is indicated at 14, this being of any suitable design, and being preferably provided with a bushing 15. The improved bearing forming a part of this invention comprises a sleeve 16 rotatable in the bushing, this sleeve terminating at its outer end in an enlarged cup 17 in which a ball clutch 18 is confined. This clutch, as shown in Fig. 2, comprises a pocketed head 19 in the pockets of which spring pressed balls 20 are arranged and pressed into engagement with a wear surface on the inner periphery of the clutch.

It will be noticed that the clutch is provided at its center with a square socket 21 through which the hand crank passes. This pocket serves to accommodate the aforesaid locking key at 5. Obviously, it is necessary to aline the key with diagonally opposite corners of the square sockets in order to permit the hand crank to be forced in and coupled to the clutch elements. A coiled spring 22 is employed for forcing the hand crank out of engagement with the clutch, when it is released.

It is yet to be pointed out that the clutch 17 is provided with a lug 23 which engages the aforesaid stationary bearings 14 to prevent rotation of the cup in one direction.

Obviously, by forcing the hand crank in against the tension of the spring 22 within a customary manner, the keys will be forced against the square socket 21. In order to permit them to enter the socket, however, it is necessary to aline the keys, as before stated with diagonally opposite corners of the pocket. In this way, the cup 17 and the bearing sleeve 16 are coupled to the portion 4 of the hand crank. Thus by rotating the entire structure, the clutch element 6 may be engaged with the pin on the engine shaft in the usual way, and the crank turned over. In case the engine back-fires, the ball locking clutch will connect the hand crank with the parts 16 and 17 which may be anchored against in any convenient manner. Obviously, then, this will prevent retrograde rotation of the hand crank in a well known manner.

In order, however, to relieve the parts of the invention of undue strain, the clutch element 6 can turn around the collar 10 as before explained and, obviously, as soon as the hand crank is released, the spring 22 will force it out and in view of the several features of construction, it is obvious that the device will act as a safety appliance and will effectively accomplish the results designed for it.

Minor changes coming within the field of invention claimed may be resorted to if desired.

Having thus described my invention, what I claim as new is:—

1. In a safety hand crank, a bearing including a sleeve having a cup at one end, a wear ring in said cup, a ball clutch fitted in said cup and cooperable with said ring, said clutch being provided with a square socket, and keys on said hand crank cooperable with said socket, to effect a connection between the clutch and hand crank.

2. In a safety hand crank, a bearing including a sleeve having a cup at one end, a wear ring in said cup, a clutch head fitted into said cup and having pockets on its periphery, spring pressed friction balls located in said pockets and cooperable with said wear ring, said head being provided at its center with a square socket, said hand crank being adapted to be provided with keys cooperable with said socket to effect a connection between the crank and clutch.

In testimony whereof I affix my signature.

NICKOLAS J. SARNICKY.